United States Patent
Brouda (10) Patent No.: US 8,826,339 B2
(45) Date of Patent: Sep. 2, 2014

(54) RF/IP VIRTUAL CHANNEL MAPPING FOR A DIGITAL VIDEO RECEIVER

(75) Inventor: David Brouda, Newtown, PA (US)

(73) Assignee: General Instrument Corporation, Horsham, PA (US)

(*) Notice: Subject to any disclaimer, the term of this patent is extended or adjusted under 35 U.S.C. 154(b) by 1409 days.

(21) Appl. No.: 11/963,175

(22) Filed: Dec. 21, 2007

(65) Prior Publication Data

US 2009/0165066 A1 Jun. 25, 2009

(51) Int. Cl.
*H04N 5/445* (2011.01)
*H04N 21/643* (2011.01)
*H04N 21/434* (2011.01)
*H04N 21/8543* (2011.01)
*H04N 21/858* (2011.01)
*H04N 21/462* (2011.01)
*H04N 21/235* (2011.01)
*H04N 5/44* (2011.01)
*H04N 21/6405* (2011.01)
*H04N 21/61* (2011.01)
*H04N 21/435* (2011.01)

(52) U.S. Cl.
CPC ....... *H04N 21/435* (2013.01); *H04N 21/64322* (2013.01); *H04N 21/4345* (2013.01); *H04N 21/8543* (2013.01); *H04N 21/8586* (2013.01); *H04N 21/4622* (2013.01); *H04N 21/235* (2013.01); *H04N 5/4401* (2013.01); *H04N 21/6405* (2013.01); *H04N 21/6125* (2013.01); *H04N 60/43* (2013.01)
USPC ............... 725/48; 725/37; 725/51; 725/56; 725/59; 725/61

(58) Field of Classification Search
CPC . H04N 21/431; H04N 21/434; H04N 21/462; H04N 21/4622; H04N 21/4828; H04N 21/8543
USPC ................ 725/37, 48, 51, 56, 59, 6
See application file for complete search history.

(56) References Cited

U.S. PATENT DOCUMENTS

| | | | |
|---|---|---|---|
| 6,763,522 B1* | 7/2004 | Kondo et al. | 725/39 |
| 2004/0040036 A1* | 2/2004 | An | 725/39 |
| 2005/0210138 A1* | 9/2005 | Zigmond et al. | 709/227 |
| 2007/0074245 A1* | 3/2007 | Nyako et al. | 725/34 |
| 2007/0195889 A1* | 8/2007 | Hong et al. | 375/240.25 |
| 2007/0250870 A1* | 10/2007 | Kim et al. | 725/81 |
| 2008/0022310 A1* | 1/2008 | Poling et al. | 725/46 |

OTHER PUBLICATIONS

ISO/IEC 13818-1 Information technology—Generic coding of moving pictures and associated audio information: Systems, Third edition, Oct. 15, 2007, pp. 188.
ATSC Standard: Program and System Information Protocol for Terrestrial Broadcast and Cable (Revision C) With Amendment No. 1, A65/C, May 9, 2006, pp. 155.
ISO/IEC 13818-2 Information technology—Generic coding of moving pictures and associated audio information: Video, Second edition, Dec. 15, 2000, pp. 219.

* cited by examiner

*Primary Examiner* — Nasser Goodarzi
*Assistant Examiner* — Kyu Chae
(74) *Attorney, Agent, or Firm* — Lori Anne D. Swanson (57) ABSTRACT

Various embodiments of systems, methods, and computer programs for implementing radio frequency (RF) and Internet Protocol (IP) virtual channel maps (VCM) in an integrated RF/IP digital video receiver (DVR) are provided. One embodiment comprises a method for managing virtual channel information in an integrated RF/IP digital video receiver. One such method comprises: receiving a data set associated with at least one IP transport stream; determining at least one virtual channel number (VCN) and at least one corresponding delivery parameter associated with the IP transport stream; and associating the VCN with the delivery parameter in a virtual channel map (VCM).

16 Claims, 9 Drawing Sheets

FIG. 2

| Supplemental VCM Channel Data | Type/Format |
|---|---|
| Virtual Channel Number | Numerical Value (0-8191) |
| Type | IP or 64QAM, 256QAM, QPSK |
| Bit Rate | Transport Stream bit rate, numerical value in [Mega\|kilo]bits per second (IP-only) |
| Video Format | HD or SD |
| Name | Channel Name |
| Description | Text Description |
| IP Multicast Destination Address | Dotted Decimal IP Address |
| UDP/IP Destination Port Number | Numerical Value (0-65535) |
| IP Source Address | Dotted Decimal IP Address |
| MPEG Program Number | Numerical Value (0-65535) |
| Transport Stream ID | Numerical Value (0-65535) |
| Secondary IP Multicast Destination Address | Dotted Decimal IP Address |
| Secondary UDP/IP Destination Port Number | Numerical Value (0-65535) |
| Secondary IP Source Address | Dotted Decimal IP Address |
| Secondary MPEG Program Number | Numerical Value (0-65535) |
| Secondary Transport Stream ID | Numerical Value (0-65535) |
| RF Center Frequency | Numerical Value in MegaHetz (only used if type RF) |

*FIG. 3*

| Supplemental VCM Header Data | Type/Format |
|---|---|
| VCTID/VCMID | Numerical Value (0-65535) |
| Version | Numerical Value (0-4294967295) |
| Records Modified | List of New/Modified/Deleted Channel Number<br><br>Wild Cards and other regular expression mechanisms permitted |

*FIG. 4*

```
<SVCM ID=256 Version=99>
    <ModifiedRecords>
        1,520
    </ModifiedRecords>
    <VCN 1 Type=IP BitRate=4000K Format=SD>
      <Name>
          Channel-1
      </Name>
      <Description>
       This  is  the   description   of  Channel-1.
      </Description>
        <IP Multicast Destination Address>
            239.100.100.100
        </IP Multicast Destination Address>
        <UDP Destination Port>
            12345
        </UDP Destination Port>
        <IP Multicast Source Address>
            192.168.100.1
        </IP Multicast Source Address>
        <MPEG Program Number>
            55
        </MPEG Program Number>
        <MPEG Transport Stream ID>
            63
        </MPEG Transport Stream ID>
        <IP Multicast Destination Address Secondary>
            239.101.100.100
        </IP Multicast Destination Address Secondary>
        <UDP Destination Port Secondary>
            12345
        </UDP Destination Port Secondary>
        <IP Multicast Source Address Secondary>
            192.168.101.1
        </IP Multicast Source Address Secondary>
        <MPEG Program Number Secondary>
            55
        </MPEG Program Number Secondary>
        <MPEG Transport Stream ID Secondary>
            63
        </MPEG Transport Stream ID Secondary>
    </VCN>
```

FIG. 5a

```
<VCN 520 Type=256QAM Format=SD Center=711.0000>
   <Name>
      Sports520
   </Name>
   <Description>
    This  is  a  regional  sports  channel.
   </Description>
      <MPEG Program Number>
         90
      </MPEG Program Number>
      <MPEG Transport Stream ID>
         101
      </MPEG Transport Stream ID>
</VCN>
</SVCM>
```

FIG. 5b

```
<SVCM ID=256 Version=100>
    <ModifiedRecords>
        519
    </ModifiedRecords>
    <VCN 1 Type=IP BitRate=4000K Format=SD>
      <Name>
          Channel-1
      </Name>
      <Description>
       This  is  the  description  of  Channel-1.
      </Description>
        <IP Multicast Destination Address>
            239.100.100.100
        </IP Multicast Destination Address>
        <UDP Destination Port>
            12345
        </UDP Destination Port>
        <IP Multicast Source Address>
            192.168.100.1
        </IP Multicast Source Address>
        <MPEG Program Number>
            55
        </MPEG Program Number>
        <MPEG Transport Stream ID>
            63
        </MPEG Transport Stream ID>
        <IP Multicast Destination Address Secondary>
            239.101.100.100
        </IP Multicast Destination Address Secondary>
        <UDP Destination Port Secondary>
            12345
        </UDP Destination Port Secondary>
        <IP Multicast Source Address Secondary>
            192.168.101.1
        </IP Multicast Source Address Secondary>
        <MPEG Program Number Secondary>
            55
        </MPEG Program Number Secondary>
        <MPEG Transport Stream ID Secondary>
            63
        </MPEG Transport Stream ID Secondary>
    </VCN>
```

*FIG. 6a*

```
<VCN 519 Type=256QAM Format=SD Center=711.0000>
  <Name>
     News519
  </Name>
  <Description>
   This  is  a  regional  news  channel.
  </Description>
     <MPEG Program Number>
        89
     </MPEG Program Number>
     <MPEG Transport Stream ID>
        101
     </MPEG Transport Stream ID>
</VCN>
  <VCN 520 Type=256QAM Format=SD Center=711.0000>
    <Name>
       Sports520
    </Name>
    <Description>
     This  is  a  regional  sports  channel.
    </Description>
       <MPEG Program Number>
          90
       </MPEG Program Number>
       <MPEG Transport Stream ID>
          101
       </MPEG Transport Stream ID>
  </VCN>
</SVCM>
```

FIG. 6b

RF/IP VIRTUAL CHANNEL MAPPING FOR A DIGITAL VIDEO RECEIVER

BACKGROUND

Digital set-top boxes and digital video receivers (collectively referred to as digital video receivers) are devices for receiving video signals from a content delivery network. A DVR receives and processes the video signal from the content delivery network for display on a display device, such as a television set or other display device. The DVR may comprise a stand-alone device that interfaces with the display device, or the functionality of the DVR may be integrated with the display device. There are DVRs that support reception of radio frequency (RF) video signals provided by terrestrial (i.e., over-the-air), cable, and satellite systems. The RF video signal may comprise an analog/RF video signal or a modulated digital signal (e.g., a quadrature amplitude modulation (QAM)/RF video signal).

While any user content may be delivered to the DVR (e.g., video, audio, data, or any combination thereof), these systems are typically used to deliver video and associated audio to the DVR via transport streams. For example, one format for broadcasting digital content to the DVR is the MPEG-2 standard. The MPEG-2 standard is an international standard for the generic coding of moving pictures and associated audio information, defined by the Moving Pictures Expert Group (MPEG). The specifications for the MPEG-2 standard (ISO/IEC 13818) are hereby incorporated by reference in their entirety. In general, the MPEG-2 standard specifies the format of movies and other programs that are distributed on physical media, such as digital video discs (DVD) and similar discs, or provided via content delivery networks.

A typical content delivery network supports a wide range of content provided to the DVR as channels. To enable users to select among the various available channels and facilitate the tuning of the DVR to the selected channel, the DVR and the content delivery network support a mechanism for specifying information about the channels. For example, users typically access analog or digital RF channels through the DVR via a user interface by selecting a virtual channel number (VCN). The DVR uses the user-selected VCN to perform internal look-ups in tables based on a virtual channel table (VCT) or a virtual channel map (VCM) provided by the content delivery network. The DVR stores the necessary data for performing the VCN look-up in a virtual channel map (VCM). The VCM contains references for the VCNs (which are known by the user via the user interface) and information necessary to access the RF channels. For analog RF channels this information may comprise a center tuning frequency, and for digital RF channels this information may comprise the VCN, center frequency, digital carrier format (e.g., 64-QAM or 256-QAM) and an MPEG Program Number.

While any suitable provisioning or look-up mechanism may be implemented in such systems, the Program and System Information Protocol (PSIP) has evolved as a standard for facilitating the tuning of programs by specifying information at the system and event levels for all virtual channels carried in a particular transport stream. The PSIP standard defined by the Advanced Television Systems Committee (ATSC) in "*ATSC Standard: Program and System Information Protocol for Terrestrial Broadcast and Cable,*" ATSC Document A/65 (and all prior versions), are hereby incorporated by reference in their entirety. Other standard and proprietary protocols perform similar functionality to PSIP.

In general, the PSIP standard and other similar protocols comprise a collection of data tables defined by the content delivery network and provided to the DVR. The data tables contain information to enable appropriately-configured DVRs to find the components needed to present a program or event. One or more tables may comprise information about the channels and information related to the programs on each channel. For example, a virtual channel map (VCM) provides various attributes for all virtual channels in a transport stream. The VCM contains a list of channels in the transport stream, as well as other information about the channels and related programs. Because channels and programs change over time, the parameters contained in the VCM must be accurately maintained, in real-time or near-real-time, to enable the DVR to access the actual connection path.

There are also DVR devices that are configured to support video over IP or IP television (IPTV). IPTV is a system in which a digital television service is delivered by using Internet Protocol over a network infrastructure, which may include delivery by a broadband connection. In general, IPTV is television content that, instead of being delivered through traditional broadcast and cable formats, is received by the user through the technologies used for computer networks.

As a service to end users, IPTV is provided as a separate service than RF-based services. IPTV is provided in connection with Internet-based services, such as, for example, video-on-demand services, web access, and voice over IP (VoIP) services. IPTV is typically supplied by a service provider using a closed network infrastructure, which is similar to the closed business model of RF-based delivery systems. The closed network approach adopted by current RF and IP-based systems has been and continues to be in direct competition with open business models that deliver content over the public Internet.

Therefore, there is a need for improved systems, methods, and computer software for integrating RF and IP virtual channels for an integrated RF/IP DVR.

SUMMARY

Various embodiments of systems, methods, and computer software are disclosed for implementing radio frequency (RF) and Internet Protocol (IP) virtual channel maps (VCM) in an integrated RF/IP digital video receiver (DVR). One embodiment comprises a digital video receiver. One such digital video receiver comprises: an RF tuner adapted to receive an RF stream; a network interface device adapted to communicate with an IP network; a virtual channel manager in communication with a user interface for enabling a user to select content provided via the RF tuner and the network interface, the virtual channel manager comprising: logic configured to receive a data set associated with at least one IP transport stream to be received via the network interface device; logic configured to determine at least one virtual channel number (VCN) and at least one corresponding delivery parameter associated with the IP transport stream; and logic configured to associate the VCN with the delivery parameter in an IP virtual channel map.

Another embodiment comprises a method for managing virtual channel information in an integrated RF/IP digital video receiver. One such method comprises: receiving a data set associated with at least one IP transport stream; determining at least one virtual channel number (VCN) and at least one corresponding delivery parameter associated with the IP transport stream; and associating the VCN with the delivery parameter in a virtual channel map (VCM).

Yet another embodiment comprises a computer program embodied in a computer-readable medium for managing virtual channel information in an integrated RF/IP digital video receiver. One such computer program comprises: logic configured to receive a data set associated with at least one IP transport stream; logic configured to determine at least one virtual channel number (VCN) and at least one corresponding delivery parameter associated with the IP transport stream; and logic configured to associate the VCN with the delivery parameter in a virtual channel map (VCM).

DETAILED DESCRIPTION

Various embodiments of systems, methods, and computer software are disclosed for implementing radio frequency (RF) and Internet Protocol (IP) virtual channel maps (VCM) in an integrated RF/IP digital video receiver (DVR). As described below in more detail, the integrated RF/IP DVR generally comprises a hybrid DVR that supports reception of RF video (e.g., standard analog/RF video and quadrature amplitude modulation (QAM)/RF video) and video over IP. The integrated RF/IP DVR provides a virtual channel manager functionality that supports the specification of information about RF channels delivered via an RF delivery network and IP channels delivered via an IP network. The virtual channel manager functionality enables the integrated RF/IP DVR to acquire, store, and manage information about the RF and IP channels based on a system-defined provisioning mechanism.

The provisioning mechanism supports data specifications for enabling the integrated RF/IP DVR to maintain an up-to-date association between user-selectable virtual channels and the information required for the integrated RF/IP DVR to receive the respective RF and IP channels. In this manner, a user may select among the various available RF and IP channels, and the integrated RF/IP DVR facilitates the tuning of the device for RF channels and acquisition of IP transport streams for IP channels. It should be appreciated that an RF channel generally refers to a channel for receiving content (e.g., audio, video, data, or any combination thereof) via an RF-delivery network, and an IP channel generally refers to a channel for receiving content via an IP network. It should be appreciated that the provisioning mechanism and the data specifications may be implemented in any desirable fashion. In one of a number of possible embodiments, the PSIP standard described above is implemented. One of ordinary skill in the art will appreciate, however, that related or alternative methods may be implemented.

Figure 1:
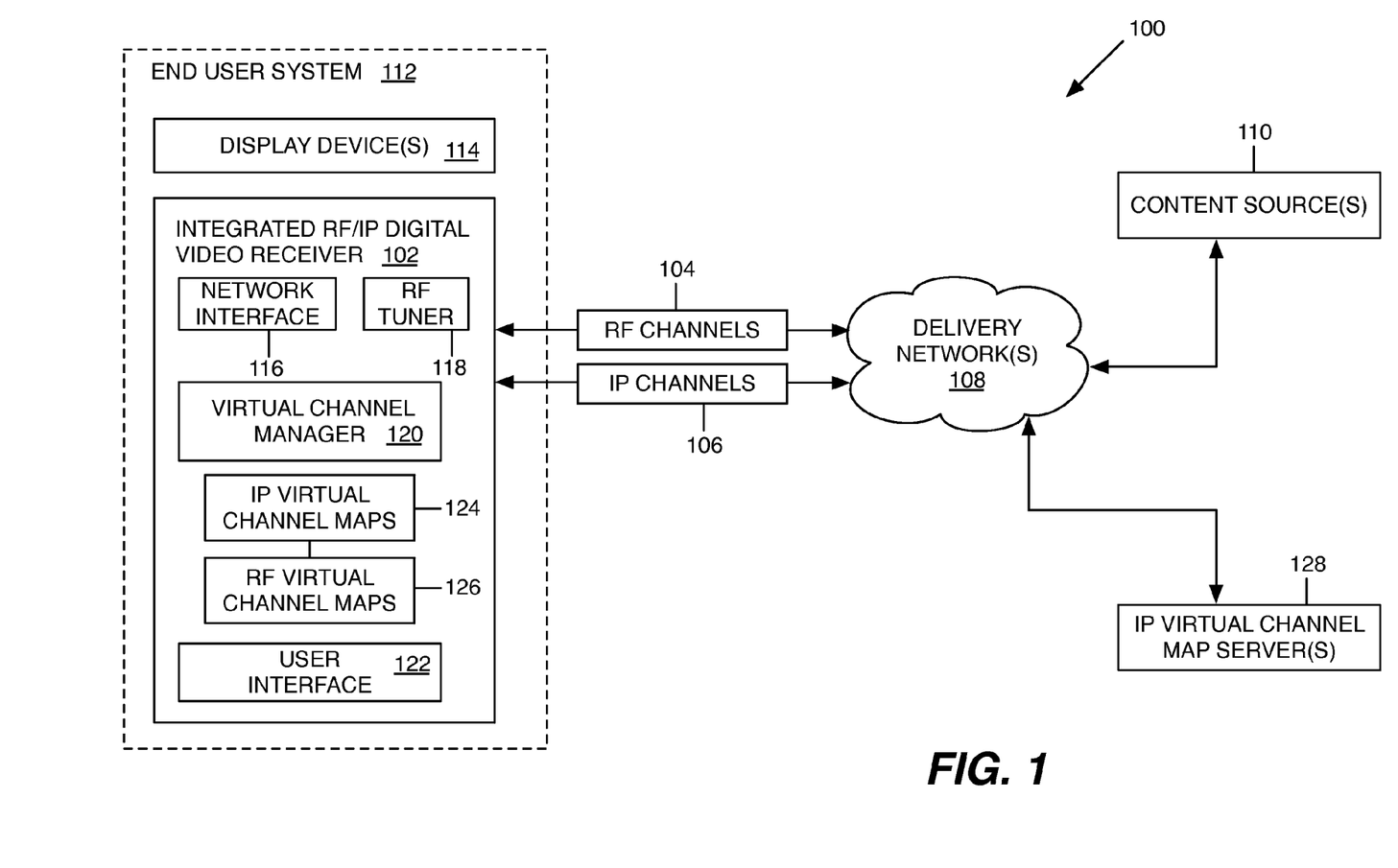
FIG. 1 is a block diagram illustrating one of a number of possible embodiments of a system for implementing RF and IP virtual channel maps (VCM) in an integrated RF/IP digital video receiver (DVR).

FIG. 1 illustrates a system 100 for implementing RF and IP virtual channel maps in an integrated RF/IP digital video receiver 102. The system 100 enables the integrated RF/IP DVR 102 to receive RF channels 104 and IP channels 106 via any desirable RF and/or IP delivery networks 108. The RF channels 104 and the IP channels 106 may be provided by one or more content source(s) 110. The RF channels 104 may be provided to the integrated RF/IP DVR 102 via an over-the-air, cable, satellite, or other broadcast system. The IP channels 106 may be provided via any suitable computer network implementing Internet Protocol.

As illustrated in FIG. 1, the integrated RF/IP DVR 102 comprises a component of an end user system 112. Display device 114 and the integrated RF/IP DVR 102 may comprise a single stand-alone device, or the integrated RF/IP DVD 102 may be configured to interface with one or more display devices 114, such as, for example, a television, a computer, or a computer monitor. The integrated RF/IP DVR 102 generally comprises a network interface 116, an RF tuner 118, a virtual channel manager 120, and a user interface 122. The network interface 116 comprises any device configured to interface with an IP computer network. The RF tuner 118 receives and tunes an RF signal, on which RF channels 104 may be received by the integrated RF/IP DVR 102. In general, the virtual channel manager 120 comprises the functionality for obtaining, processing, managing, and storing data related to the user-selectable virtual channels corresponding to the RF channels 104 and the IP channels 106. The virtual channel manager 120 interfaces with the user interface 122 for receiving user channel selections. The user interface 122 may comprise, for example, a graphical user interface (GUI), such as an electronic program guide (EPG), or a simplified interface such as hard keys.

Figure 2:
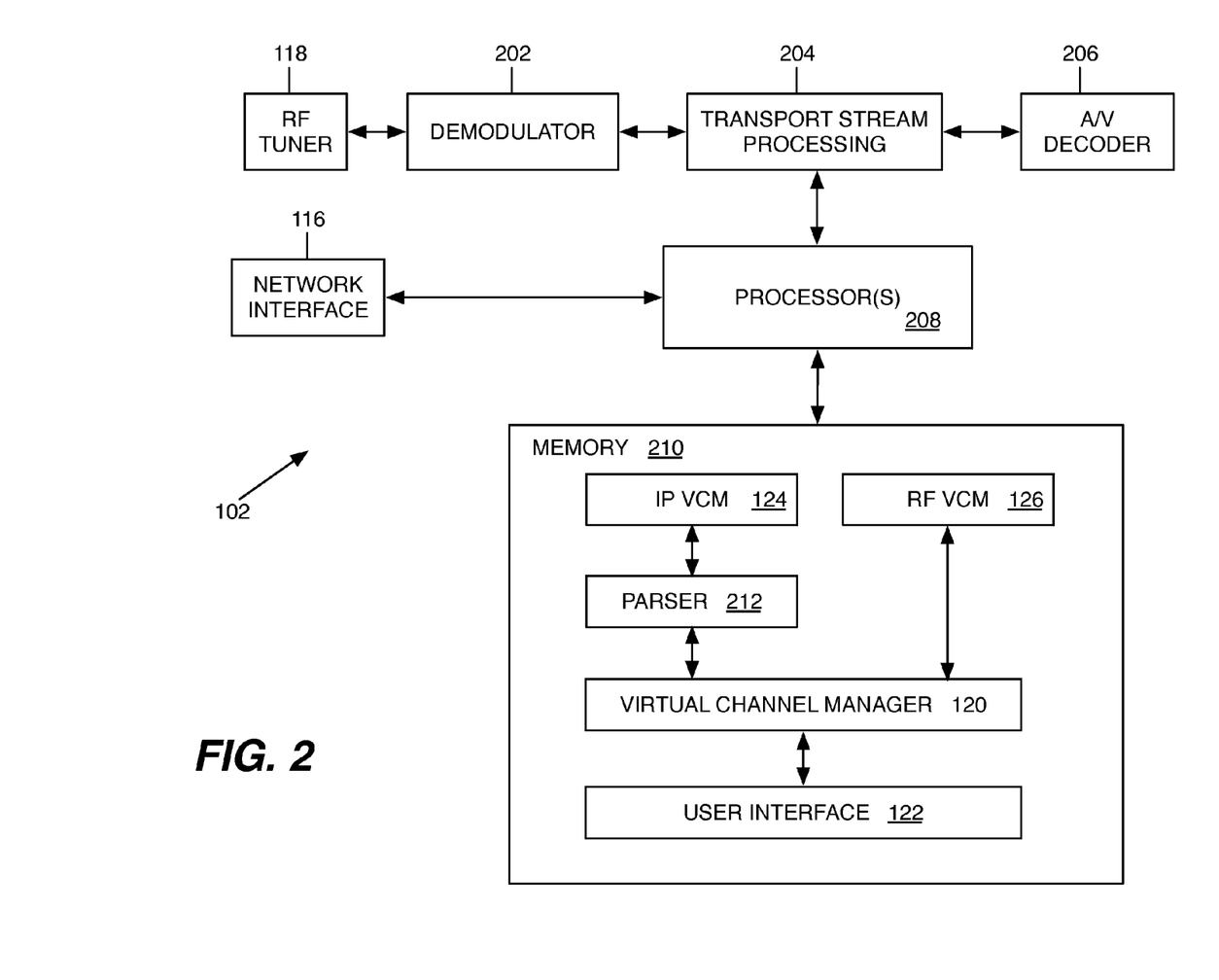
FIG. 2 is a block diagram illustrating the integrated RF/IP digital video receiver in the system of FIG. 1.

FIG. 2 illustrates additional components of an exemplary integrated RF/IP DVR 102. The integrated RF/IP DVR 102 may comprise a demodulator 202, a transport stream processing functionality 204, an audio/video decoder 206, one or more processors 208, and a memory 210. The demodulator 202 demodulates the RF signal received by the RF tuner 118. The transport stream processing functionality 204 receives the demodulated signal and demultiplexes the audio, video, data, and other components from the transport packets. The A/V decoder 206 receives and decodes audio and video data and outputs the decoded data to the display device 114.

The integrated RF/IP DVR 102 may comprise one or more processor(s) 208 for controlling the operation of various aspects of the device. One of ordinary skill in the art will appreciate that virtual channel manager 120 (and other functionality, such as parser 212 described below) may be implemented in software, hardware, firmware, or a combination thereof. In the embodiment illustrated in FIG. 2, the virtual channel manager 120 and parser 212 are implemented in software or firmware that is stored in a memory 210 and that is executed by a suitable instruction execution system (e.g., processor(s) 208). In software or firmware embodiments, the logic may be written in any suitable computer language. In hardware embodiments, the virtual channel manager 120 and parser 212 may be implemented with any or a combination of the following, or other, technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As mentioned above, the virtual channel manager 120 may be configured to acquire, process, store, and manage information about the RF and IP channels based on a system-defined provisioning mechanism. The virtual channel manager 120 may be configured to support the PSIP standard, Digital Video Broadcasting (DVB) standards (e.g., DVB-S, DVB-T, DVB-H, DVB-MT, DVB-MC, etc.), Multipoint Video Distribution System (MVDS) standards, or other proprietary or open standards providing similar functionality. For receiving information about the IP channels 106, the virtual channel manager 120 may receive an IP transport stream data set from one of the content sources 110 or a hosting entity (e.g., IP virtual channel map server(s) 128— FIG. 1).

The IP transport stream data set may be provided to the integrated RF/IP DVR 102 via any suitable delivery mechanism, communication protocol(s), data formats, etc. For example, the IP transport stream data set may be provided to the integrated RF/IP DVR 102 via an RF-delivery network. In a preferred embodiment, the IP transport stream data set is provided by server(s) 128 (FIG. 1) via an IP network (e.g., the Internet). It should be appreciated that the data set may be "pushed" to, or "pulled" from, the integrated RF/IP DVR 102, or a combination of both. Various data formats may be implemented. In general, the IP transport stream data set comprises information used by the integrated RF/IP DVD 102 to relate IP-delivered streams (e.g., IP multicast streams) to virtual channel numbers used by the user interface 122. In one embodiment, the IP transport stream data set supports an open data standard that enables content providers to customize the format and types of data contained in the data set. One possible implementation supports the extensible markup language (XML) standard.

The IP transport stream data set may comprise various types and forms of data suitable for enabling the integrated RF/IP DVR 102 to receive IP transport streams. The IP transport streams may comprise video, audio, data, or any combination thereof. The IP transport stream represents a single stream of related video, audio, and/or data, although the data set may support one or more streams of unrelated video, audio, and/or data components. The IP transport stream may be transmitted via, for instance, IP multicast addressing schemes for efficient delivery from one or more content sources to multiple receivers.

Figure 3:
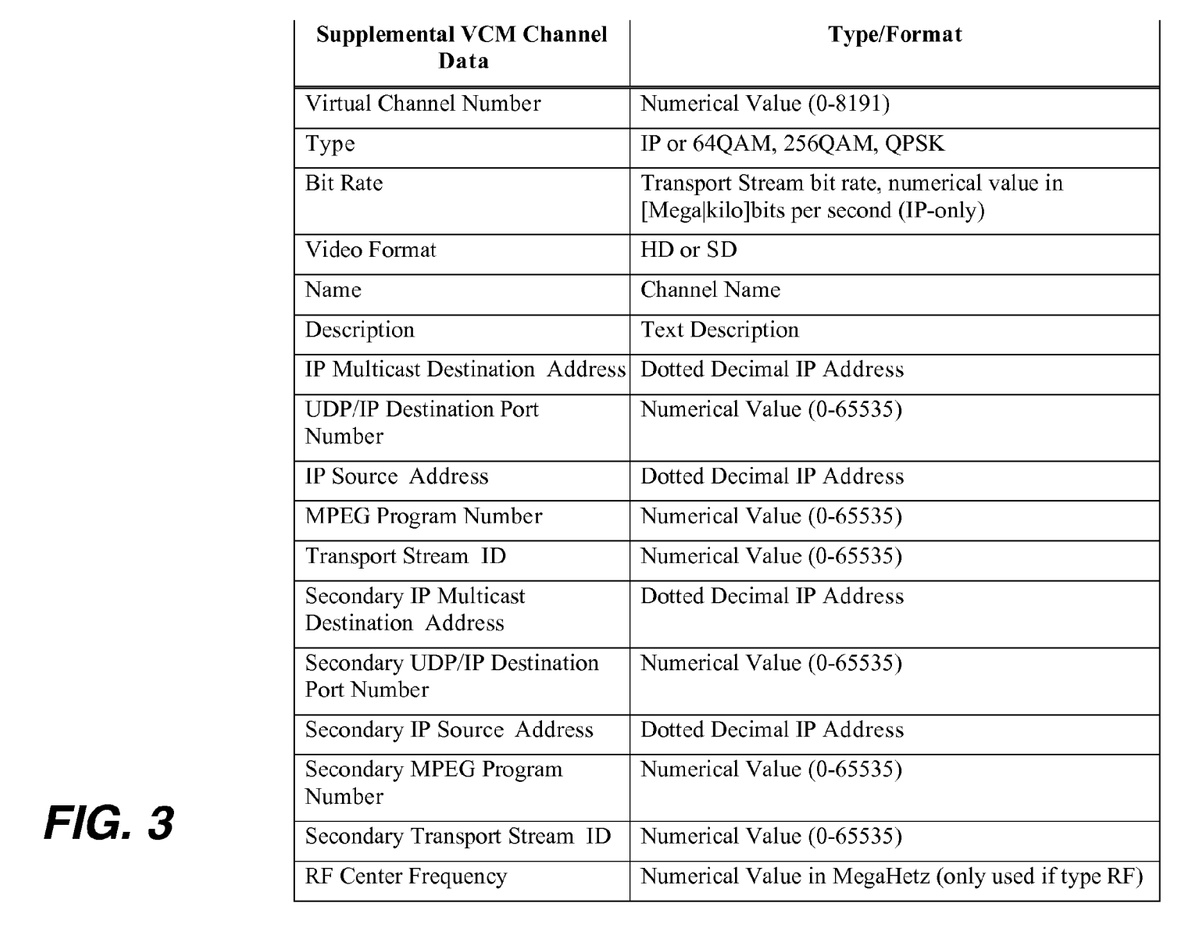
FIG. 3 is a data structure associated with an embodiment of an IP virtual channel map.

As illustrated in FIG. 3, the IP transport stream data set may comprise information related to a plurality of IP transport streams. Each IP transport stream may have a corresponding numerical value identifying the IP transport stream from the perspective of the user interface 122. Other data related to the IP transport stream may comprise any of the following, or other types of delivery parameters: a channel type; transport stream bit rate; video format; channel name; channel description; IP multicast destination address; UDP/IP destination port number; IP source address; MPEG program number; transport stream identifier; secondary IP multicast destination address, secondary UDP/IP destination port number, secondary IP source address, secondary MPEG program number, and secondary transport number (for purposes of delivery redundancy or efficiency); and an RF center frequency (for RF-type streams). One of ordinary skill in the art will appreciate that the data set need not include all of these types of data, and may include additional or alternative types and forms of data for delivering the IP transport streams to the integrated RF/IP DVR 102. It should be further appreciated that the IP transport stream data set may comprise related, alternative or additional placeholders for look-up table data that may be used by the integrated RF/IP DVR 102 to associate virtual channel numbers to corresponding IP transport streams, and which may support the PSIP or similar standards.

As mentioned above, the integrated RF/IP DVR 102 may acquire the IP transport stream data set via any desirable method. The data set may support proprietary delivery mechanisms, although it may be desirable, in certain embodiments, to support an open standard for convenient implementation. In one embodiment, the data set may be provided to the integrated RF/IP DVR 102 via XML standards. Any of the data described above, or any other related data, may be defined in a well-formed XML document or file. The virtual channel manager 120 may be configured with appropriate software to process the XML document (e.g., parser 212).

The network interface 116 provides a convenient access method for receiving XML data via the server(s) 128. The XML file can easily be delivered over an HTTP or HTTPS connection between the integrated RF/IP DVR 102 and the server(s) 128. The server(s) 128 may support unique XML datasets for multiple integrated RF/IP DVRs 102. In this regard, the server(s) 128 may identify respective XML datasets by a unique identifier. In one embodiment, the unique identifiers may be implemented using a Virtual Channel Table Identifier (VCTID) or a Virtual Channel Map Identifier (VCMID), as defined by the PSIP or similar standards, in which the XML data set comprises a supplemental VCMID having equivalent values as a corresponding VCMID.

Figure 4:
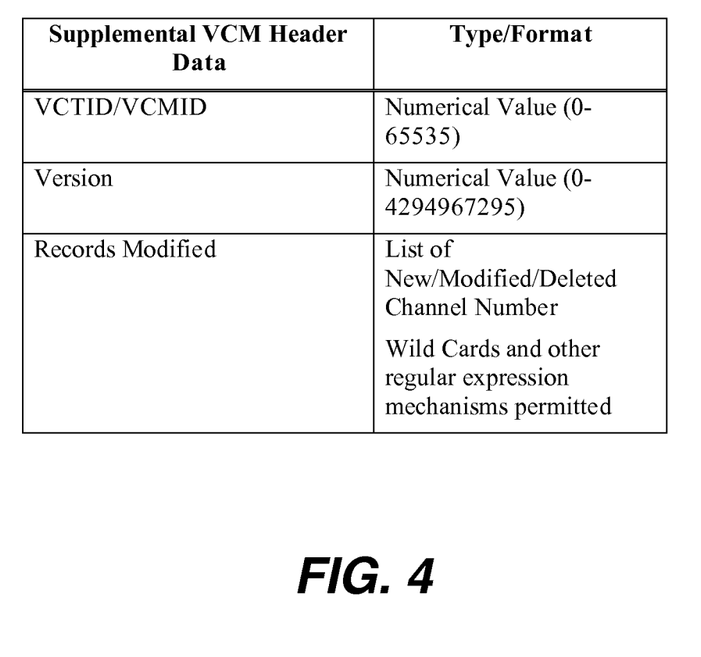
FIG. 4 is a data structure for a data header associated with the IP virtual channel map of FIG. 3.
Figure 5A:
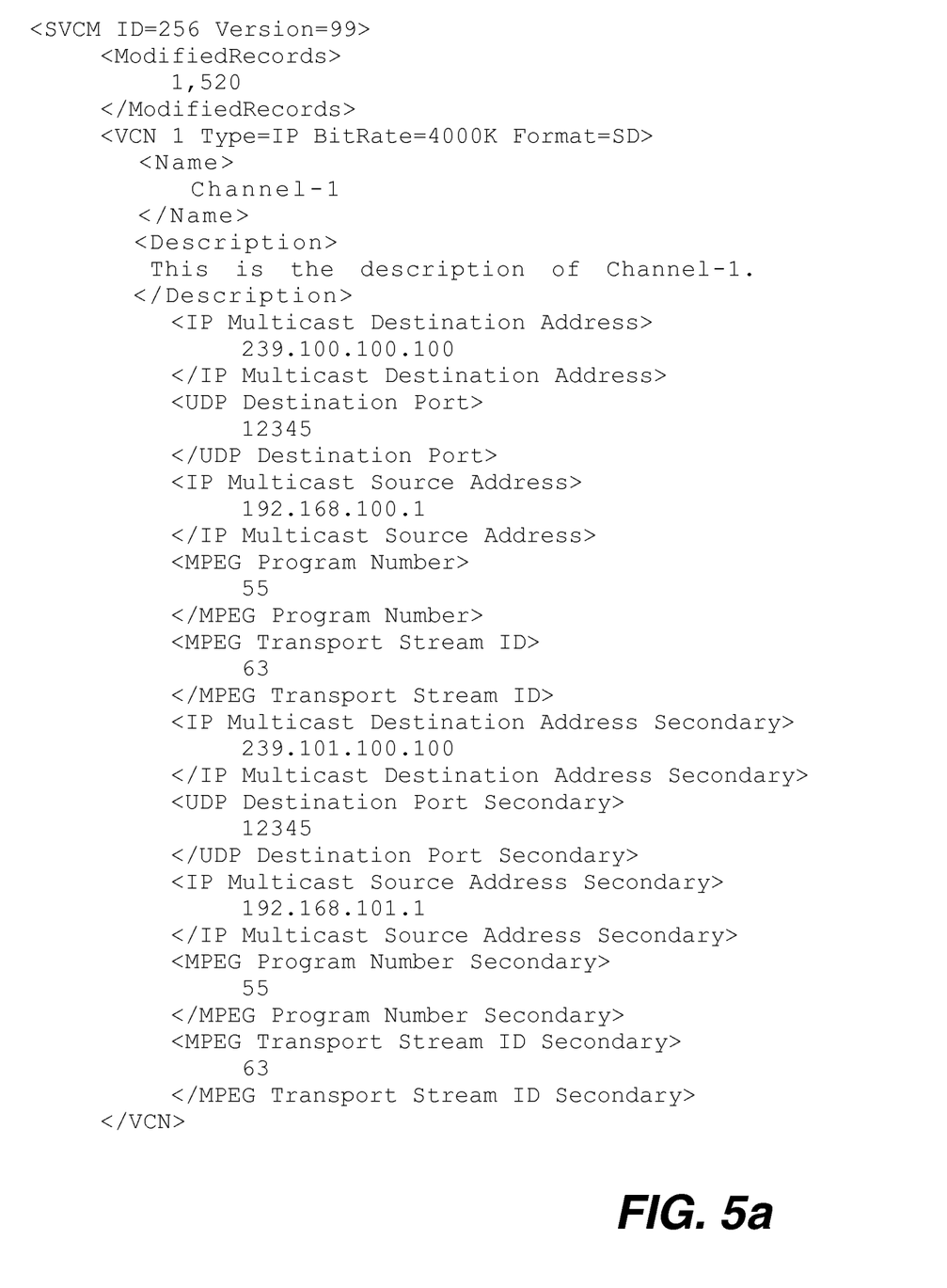
FIGS. 5a & 5b illustrate one of a number of possible embodiments of an implementation of an IP virtual channel map.
Figure 5B:
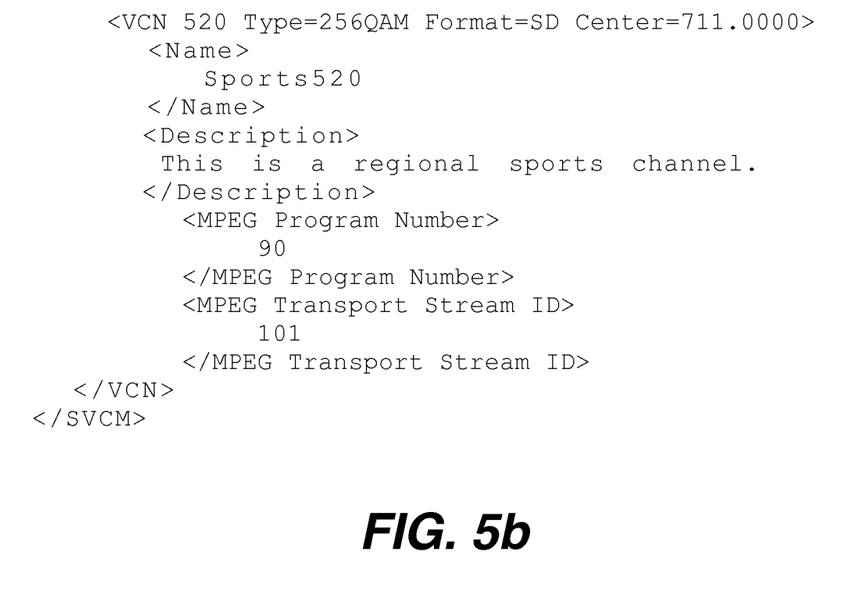

FIG. 4 illustrates an example of supplemental VCM header data for each unique XML data set, and FIGS. 5a & 5b illustrate an exemplary XML data set. In this manner, each XML data set comprises a unique identifier for the VCMID. The XML-based supplemental VCM (SVCM) may also contain a version number so the integrated RF/IP DVR 102 may recognize when there are changes to the SVCM without needing to download the entire SVCM. The version number provides a mechanism for enabling the integrated RF/IP DVR 102 to track version changes not only on a per SVCM basis but on a per record basis. The SVCM may further comprise a mechanism to identify the VCM records that have been updated/modified, deleted, or added.

Through the use of SVCM entries, the virtual channel manager 120 may be configure to overlay the data acquired from the SVCM with the data in the VCM. The IP channels 106 may acquired through data processed in the SVCM XML, while the RF channels 104 may be acquired through the regular VCM or the SVCM. By using XML, the SVCM may be easily manipulated by-hand, by the virtual channel manager 120, or by a feedback mechanism from a back-office database or a locally-stored database (e.g., in memory 210— FIG. 2).

Figure 6A:
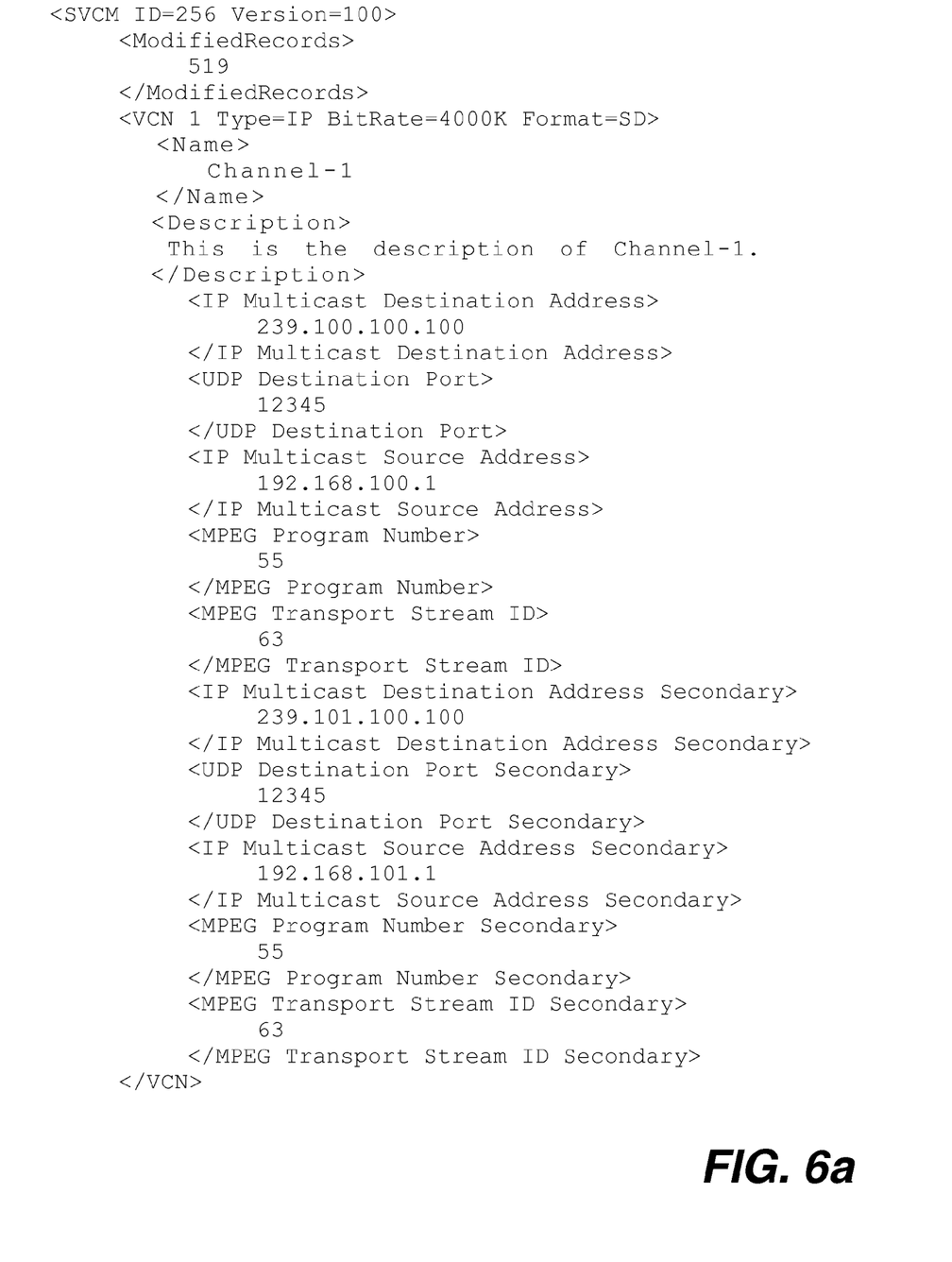
FIGS. 6a & 6b illustrate an updated version of the IP virtual channel map of FIGS. 5a & 5b.
Figure 6B:
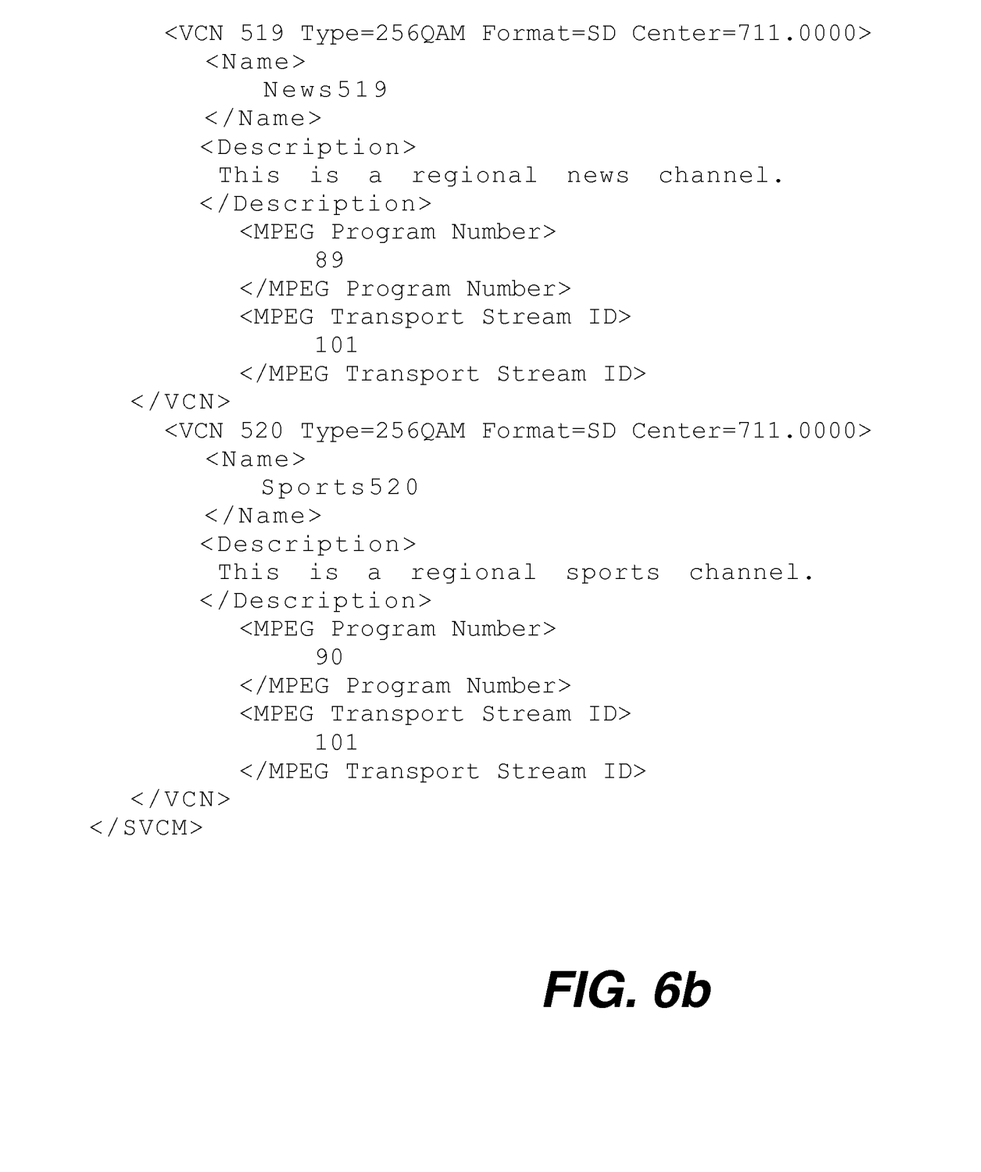

In the XML file illustrated in FIGS. 5a & 5b, a SVCM was created and the virtual channel manager 120 is notified to check channel records 1 and 520 via a ModifiedRecords parameter. If the integrated RF/IP DVR 102 had no prior knowledge of the SVCM, such that the referenced version number is the first version number, the receiver for this VCMID may automatically process all records and ignore the ModifiedRecords parameter. In the example shown in FIGS. 6a & 6b, the version number has incremented. If the integrated RF/IP DVR 102 has knowledge of this version number increment, the virtual channel manager 120 may use the ModifiedRecords parameter to go directly to the modified entry and ignore the other entries that have not changed since the previous version of the SVCM.

Figure 7:
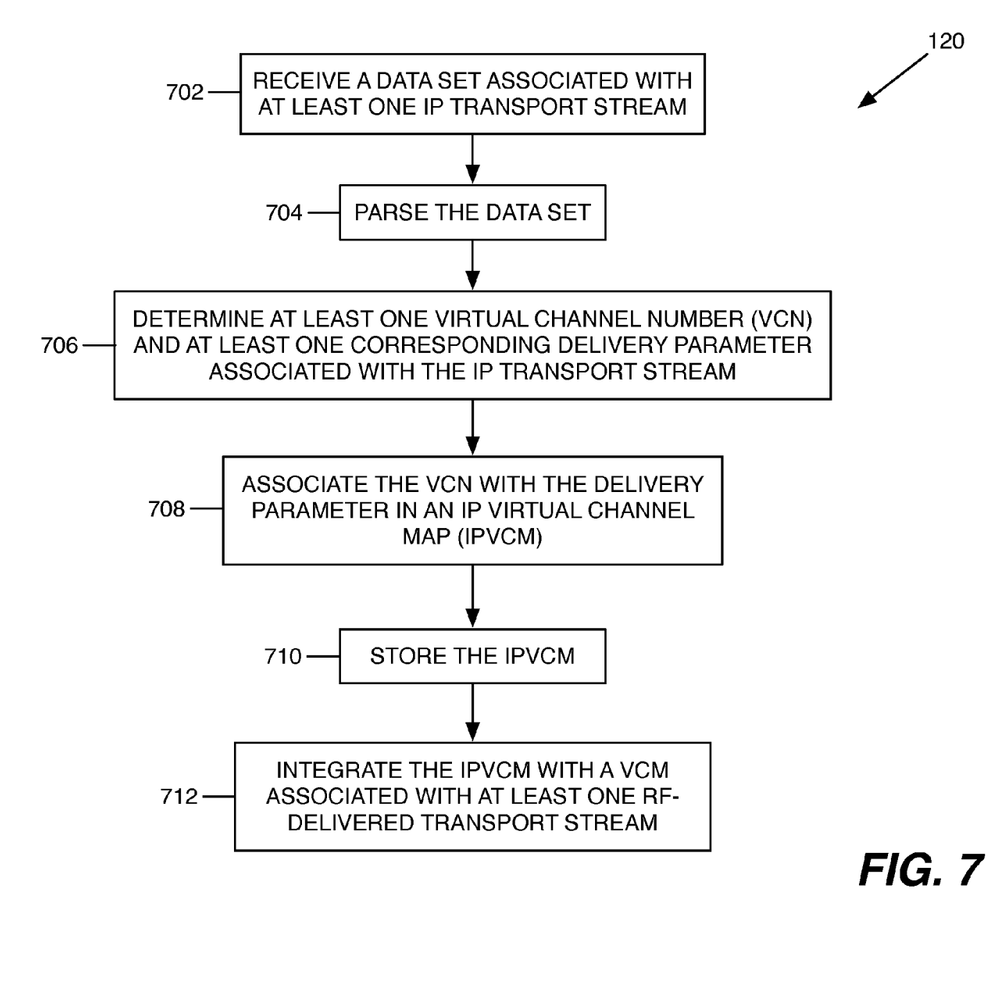
FIG. 7 is a flow chart illustrating the architecture, operation, and/or functionality of an embodiment of the virtual channel manager of FIGS. 1 and 2.

It should be appreciated that the virtual channel manager 120 may comprise the logic for implementing the SVCM methodology described above. FIG. 7 is a flow chart illustrating the architecture, operation, and/or functionality of one implementation of the virtual channel manager 120. At block 702, the virtual channel manager 120 receives a data set associated with at least one IP transport stream. In one embodiment the data set comprises an XML data set as described above. At block 704, the parser 212 parses the data set and determines relevant information related to the IP transport stream (block 706). The parser 212 may determine the virtual channel number (VCN) and at least one delivery parameter associated with the IP transport stream. At block 708, the virtual channel manager 120 associates the VCN with the delivery parameter in an IP virtual channel map 124 (FIG. 2). The IPVCM 124 may be stored in memory 210 and, as described above, may be overlayed with the VCM for the RF channels 104. The RF channels 104 may originate from another information, or the same source as the IP channels 106, using PSIP or similar standards.

One of ordinary skill in the art will appreciate that the process descriptions or blocks associated with the flow charts may represent modules, segments, logic or portions of code which include one or more executable instructions for implementing logical functions or steps in the process. It should be further appreciated that any logical functions may be executed out of order from that shown or discussed, including substantially concurrently or in reverse order, depending on the functionality involved, as would be understood by those reasonably skilled in the art.

Furthermore, the virtual channel manager 120 and parser 212 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A digital video receiver comprising:
    a radio frequency (RF) tuner adapted to receive RF streams;
    a network interface device adapted to communicate with an Internet Protocol (IP) network;
    a virtual channel manager in communication with a user interface for selecting content received via either of the RF tuner and the network interface, wherein the virtual channel manager is configured to:
        receive an RF virtual channel map referencing virtual channel numbers (VCN) for selection via the user interface, wherein virtual channel numbers (VCN) in the RF virtual channel map are mapped to access RF streams via the RF tuner,
        receive an IP transport stream data set associated with one or more IP transport streams receivable via the network interface device, the data set including a delivery parameter for each of the one or more IP transport streams for relating each of the one or more IP transport streams to a respective virtual channel number,
        parse the IP transport stream data set to determine the delivery parameter for each of the one or more IP transport streams,
        associate the delivery parameter associated with each of the one or more IP transport streams to a respective virtual channel number (VCN) in an IP virtual channel map, wherein each virtual channel number (VCN) in the IP virtual channel map is selectable for access to the one or more IP transport streams via the IP network, and
        overlay the RF virtual channel map and the IP virtual channel map for integrating access to RF and IP virtual channels via the user interface, wherein the IP transport stream data set comprises an XML file and a version number associated with the XML file and also associated with a parameter identifying a record in the XML file modified from a corresponding record in a previously received data set, whereby, for maintaining the overlaid virtual channel maps, the digital video receiver determines which records in the XML file for the received IP transport stream data set to modify from the previously received XML file for a previously received IP transport stream data set using the parameter associated with the version number.

2. The digital video receiver of claim 1, wherein the RF tuner is adapted to receive at least one of an analog RF signal or a digital signal.

3. The digital video receiver of claim 1, wherein the IP transport stream data set is received via the network interface device.

4. The digital video receiver of claim 1, wherein the IP transport stream comprises an IP multicast stream.

5. The digital video receiver of claim 1, wherein the delivery parameter comprises at least one of the following: an IP multicast destination address; a UDP/IP destination port number; an IP source address; an MPEG program number; or a transport stream ID.

6. The digital video receiver of claim 1 , wherein the version number comprises a modified records parameter indicating that the VCN or one of the delivery parameters has been modified.

7. A method for managing virtual channel information in an integrated radio frequency(RF)/Internet Protocol(IP) digital video receiver, the method comprising:
    receiving an RF virtual channel map referencing virtual channel numbers (VCN)s for selection via the user interface, wherein virtual channel numbers (VCN)s in the RF virtual channel map are mapped to access RF streams via the RF tuner;
    receiving an IP transport stream data set associated with one or more IP transport streams, the data set including a delivery parameter for each of the one or more IP transport streams for relating each of the one or more IP transport streams to a respective virtual channel number, the data set comprising an extensible markup language (XML) file associated with a version number, the version number associated with a parameter identifying a record in the XML file modified from a corresponding record in a previously received data set;

parsing the IP transport stream data set to determine the delivery parameter for each of the one or more IP transport streams;

associating the delivery parameter associated with each of the one or more IP transport streams to a respective virtual channel number (VCN) in an IP virtual channel map, wherein each virtual channel number (VCN) in the IP virtual channel map is selectable for access to the one or more IP transport streams via the IP network;

overlaying the RF virtual channel map and the IP virtual channel map for integrating access to RF and IP virtual channels via the user interface; and determining which records in the XML file for the received IP transport stream data set to modify from the previously received XML file for a previously received IP transport stream data set using the parameter associated with the version number.

8. The method of claim 7, wherein the IP transport stream may comprise an IP multicast stream or IP unicast stream.

9. The method of claim 7, wherein the delivery parameter comprises a primary value and a secondary value for at least one of the following: an IP multicast destination address; a UDP/IP destination port number; an IP source address; an MPEG program number; and a transport stream ID.

10. The method of claim 7, wherein the version number comprises a modified records parameter indicating that the VCN or the corresponding delivery parameter has been modified.

11. A non-transitory computer-readable medium for managing virtual channel information in an integrated radio frequency(RF)/Internet Protocol(IP) digital video receiver, the non-transitory computer readable medium having stored thereon a computer program comprising instructions for:

receiving an RF virtual channel map referencing virtual channel numbers (VCN)s for selection via the user interface, wherein virtual channel numbers (VCN)s in the RF virtual channel map are mapped to access RF streams via the RF tuner;

receiving an IP transport stream data set associated with one or more IP transport streams, the data set including a delivery parameter for each of the one or more IP transport streams for relating each of the one or more IP transport streams to a respective virtual channel number (VCN), the data set comprising an extensible markup language (XML) file associated with a version number, the version number associated with a parameter identifying a record in the XML file modified from a corresponding record in a previously received data set;

parsing the IP transport stream data set to determine the delivery parameter for each of the one or more IP transport streams;

associating the delivery parameter associated with each of the one or more IP transport streams to a respective virtual channel number (VCN) in an IP virtual channel map, wherein each virtual channel number (VCN) in the IP virtual channel map is selectable for access to the one or more IP transport streams via the IP network;

overlaying the RF virtual channel map and the IP virtual channel map for integrating access to RF and IP virtual channels via the user interface; and determining which records in the XML file for the received IP transport stream data set to modify from the previously received XML file for a previously received IP transport stream data set using the parameter associated with the version number.

12. The non-transitory computer-readable medium of claim 11, wherein the IP transport stream data set is received via a network interface device.

13. The non-transitory computer-readable medium of claim 11, wherein the IP transport stream may comprise an IP multicast stream IP unicast stream.

14. The non-transitory computer-readable medium of claim 11, wherein the delivery parameter comprises at least one of the following: an IP multicast destination address; a UDP/IP destination port number; an IP source address; an MPEG program number; or a transport stream ID.

15. The non-transitory computer-readable medium of claim 11, wherein the VCM supports a Program and System Information Protocol (PSIP) and other similar standards.

16. The non-transitory computer-readable medium of claim 15, wherein the VCM further comprises information related to at least one RF stream.

\* \* \* \* \*